(12) United States Patent
Andersson et al.

(10) Patent No.: US 8,407,987 B2
(45) Date of Patent: Apr. 2, 2013

(54) CONTROL METHOD FOR CONTROLLING AN EXHAUST AFTERTREATMENT SYSTEM AND EXHAUST AFTERTREATMENT SYSTEM

(75) Inventors: Lennart Andersson, Varberg (SE); Lennart Cider, Mölndal (SE)

(73) Assignee: Volvo Lastvagnar AB, Göteborg (SE)

( * ) Notice: Subject to any disclaimer, the term of this patent is extended or adjusted under 35 U.S.C. 154(b) by 602 days.

(21) Appl. No.: 12/528,094

(22) PCT Filed: Feb. 21, 2008

(86) PCT No.: PCT/SE2008/000146
§ 371 (c)(1),
(2), (4) Date: Jan. 12, 2010

(87) PCT Pub. No.: WO2008/103109
PCT Pub. Date: Aug. 28, 2008

(65) Prior Publication Data
US 2010/0139246 A1    Jun. 10, 2010

(30) Foreign Application Priority Data
Feb. 21, 2007    (SE) .................................... 0700438-5

(51) Int. Cl.
*F01N 3/033*    (2006.01)
(52) U.S. Cl. .......................................... 60/288; 60/297
(58) Field of Classification Search ..................... 60/287, 60/288, 297, 301, 295, 311
See application file for complete search history.

(56) References Cited

U.S. PATENT DOCUMENTS
3,783,619 A    1/1974    Alquist
6,484,495 B2    11/2002    Minami
(Continued)

FOREIGN PATENT DOCUMENTS
AT    501066 A2    6/2006
DE    10053097 A1    5/2002
(Continued)

OTHER PUBLICATIONS

European Search Report for corresponding European Application EP 08 71 2733.

(Continued)

*Primary Examiner* — Thomas Denion
*Assistant Examiner* — Jonathan Matthias
(74) *Attorney, Agent, or Firm* — WRB-IP LLP

(57) ABSTRACT

The invention relates to a system and a control method for an exhaust aftertreatment system (10) of an engine (12) in which one or more constituents of the exhaust gas are oxidized in an oxidation catalyst (20) and one or more constituents of the exhaust gas are deoxidized in a selective-catalytic-reduction catalyst (70), wherein the exhaust gas flows from the oxidation catalyst (20) to the selective-catalytic-reduction catalyst (70). It is. proposed to control the flow of the exhaust gas through the oxidation catalyst (20) depending on a desired ratio among the one or more constituents, wherein the exhaust gas enters the selective-catalytic-reduction catalyst (70) with the desired ratio among the one or more constituents; and to establish the desired ratio among the one or more constituents so that at a given reaction temperature in the selective-catalytic-reduction catalyst (70) one specific chemical reaction is selected out of a group of possible chemical reactions which can take place among the one or more constituents of the exhaust gas and the catalyst material in the selective-catalytic-reduction catalyst (70) at the given temperature, wherein the selected specific chemical reaction has a higher probability to be performed than each single one of the other chemical reactions which are not selected.

19 Claims, 4 Drawing Sheets

U.S. PATENT DOCUMENTS

| | | |
|---|---|---|
| 6,846,464 B2 | 1/2005 | Montreuil et al. |
| 2008/0155968 A1* | 7/2008 | Salemme et al. ............... 60/288 |
| 2010/0107610 A1* | 5/2010 | Schussler et al. ............... 60/287 |

FOREIGN PATENT DOCUMENTS

| | | |
|---|---|---|
| DE | 102005035555 A1 | 2/2007 |
| EP | 1054722 B1 | 12/2001 |
| EP | 1495796 | 1/2005 |
| EP | 1892394 A1 | 2/2008 |
| WO | 2006010506 A1 | 2/2006 |
| WO | 2007010664 A1 | 1/2007 |

OTHER PUBLICATIONS

International Search Report for corresponding International Application PCT/SE2008/000146.

International Preliminary Report on Patentability for corresponding International Application PCT/SE2008/000146.

* cited by examiner

CONTROL METHOD FOR CONTROLLING AN EXHAUST AFTERTREATMENT SYSTEM AND EXHAUST AFTERTREATMENT SYSTEM

BACKGROUND AND SUMMARY

The invention relates to a control method for controlling an exhaust aftertreatment system and an exhaust aftertreatment system.

Both carbon particulates and nitrogen oxides such as NO and NO2, also referred to as NOx, are typical emissions in the exhaust gas of diesel engines. Requirements for reducing such emissions increase, and trigger various approaches in the art to reduce emissions. In the European patent EP 1 054 722 B1 an exhaust aftertreatment system is disclosed which combines a particulate filter collecting soot and nitrogen oxides reducing catalysts in the exhaust tract. For removing soot NO2 is generated by oxidation of NO in an oxidation catalyst. Soot which is collected in a particulate 1 filter is oxidized by NO2. Residual amounts of NO and NO2 in the exhaust gas are reduced to nitrogen gas in a selective-catalytic-reduction catalyst (SCR catalyst) by injecting ammonia into the SCR catalyst. The ratio of NO2 and NO in the exhaust gas is adjusted by using an appropriate oxidation catalyst for a particular SCR catalyst. For instance, Pt/Al2O3 oxidation catalysts with different Pt contents produce different NO2/NO ratios. For a metal/zeolite SCR catalyst all NO should be oxidized to NO2, and for a rare-earth-based SCR catalyst a high NO2/NO ratio is desirable, whereas for transition-metal-based SCR catalysts gas mixtures of NO2 and NO are preferred instead of pure or mainly NO2 or NO gases.

The design of the oxidation catalyst usually has to be a compromise between an optimal passive burning of soot in the particulate filter and an optimal conversion of NO and NO2 in the SCR catalyst. For instance, at certain engine loads only an insufficient amount of NO is oxidized to NO2 resulting in that the particulate filter will be filled with soot and that the SCR catalyst's efficiency is low due to a surplus of NO. At other engine loads the NO2 formation in the oxidation catalyst will be too high resulting in a NO2 surplus into the SCR unit resulting in NO2 and N2O emissions. The exhaust gas composition varies strongly at different engine loads. The concurring processes described above yield only a narrow range of satisfying simultaneous soot oxidation and NOx conversion with respect to engine load and the resulting varying amounts of different kinds of constituents in the exhaust gas.

It is desirable to provide an improved control method for controlling an exhaust aftertreatment system for a wider range of engine loads and exhaust gas compositions. It is also desirable to provide an improved exhaust aftertreatment system which can handle the exhaust gas produced during a wide range of engine loads and exhaust gas compositions.

According to a first aspect of the invention, a control method is proposed for an exhaust aftertreatment system of an engine in which one or more constituents of the exhaust gas are oxidized in an oxidation catalyst and one or more constituents of the exhaust gas are reduced in a selective-catalytic-reduction catalyst, wherein the exhaust gas flows from the oxidation catalyst to the selective-catalytic-reduction catalyst. Instead of the expression "selective-catalytic-reduction catalyst" sometimes its abbreviation "SCR catalyst" is used in the text. The flow of the exhaust gas through the oxidation catalyst is controlled depending on a desired ratio among the constituents, wherein the exhaust gas enters the SCR catalyst with the desired ratio among the constituents; and the ratio among the constituents is established so that at a given reaction temperature in the SCR catalyst one specific chemical reaction is selected out of a group of possible chemical reactions which can take place among the constituents of the exhaust and the catalyst material in the SCR catalyst, wherein the selected specific chemical reaction has a higher probability to be performed than each single one of the other chemical reactions.

The control of the flow can be done in different ways, e.g. by using a fixed or variable bypass which circumvents the oxidation catalyst or by changing the space velocity of the exhaust gas flow in the oxidation catalyst. Generally, the space velocity in a chemical reactor design represents the relation between a volumetric flow of a feed and a reactor volume. The space velocity indicates how many reactor volumes of feed can be treated in a unit time.

Favourably, the efficiency of the selective catalytic reduction of the constituents of the exhaust gas can be optimized while at the same time good operating conditions can be provided for a particulate filter arranged between the oxidation catalyst and the SCR catalyst. The operating region where the exhaust aftertreatment system operates well can be enlarged compared to the prior art system which operates well only close to a few operating points of the engine. The method allows for an efficient exhaust aftertreatment with respect to cost, packaging and durability.

In a preferred development of the control method the control of the flow of the exhaust gas can be achieved by splitting the flow into a first portion flowing through the oxidation catalyst and a second portion flowing through a bypass line circumventing the oxidation catalyst. This can be easily done e.g. by using a controllable valve which controls the amount of exhaust gas in the bypass. Preferably, no catalytic component, particularly an oxidation catalyst is provided in the bypass line. Generally, however, a catalytic component, particularly an oxidation catalyst, can also be provided in the bypass line.

In a preferred development controlling the flow of the exhaust gas through the oxidation catalyst can be achieved by varying a flow velocity of the exhaust gas in the oxidation catalyst. This can be done by using an internal bypass inside the oxidation catalyst which allows to varying the flow distribution to the catalyst. The flow distribution may be varied by e.g. covering parts of the catalyst thus blocking catalyst against the exhaust gas, using flow guides for directing the exhaust gas and/or by opening valves that cover inlet and/or outlet ports in the oxidation catalyst. This may also be combined with a non-uniform distribution of the catalytically active material over the catalyst for further increasing the effect. Generally, an external bypass can be provided combined with the possibility to vary the space velocity of the exhaust gas flow.

Preferably, the ratio can be established in a way that the rate for the selected chemical reaction to be performed surmounts the rate for each single one of the other chemical reactions to be performed by at least a factor of 2, preferably a factor of 5, particularly preferable a factor of 10. The rate is 1/time unit (number of reactions/time unit).

Particularly, the ratio among the constituents is a ratio of NO2/NO close to 1 and preferably not exceeding 1, particularly NO2/NO=0.8±0.2, preferably NO2/NO=0.9±0.1, most preferably NO2/NO=0.95±0.05. By choosing a ratio close to 1 it is possible to trigger a fast and highly efficient chemical reaction which reduces NO as well as NO2 and NH3 to N2 gas and water in the presence of the SCR catalyst. This reaction is favourable for a wide range of exhaust gas temperatures from below 200° C. and above. Other chemical reactions are possible depending on the amount of NO2 and NO, i.e. ratio of NO2/NO, present in the SCR catalyst. These reactions, however, are typically slower and prone to competitive reactions producing N2O and the like.

According to a preferred development, the ratio among the constituents can additionally or alternatively be established depending on the amount of soot which is contained in a particulate filter arranged between the oxidation catalyst and the SCR catalyst. NO2 which is generated in the oxidation catalyst oxidizes soot trapped in the particulate filter. The amount of NO2 needed varies with the amount of soot in the particulate filter.

Advantageously, the ratio among the members of the constituents can be established depending on the amount of NO2 which is generated in the particulate filter. The particulate filter can comprise an oxidation catalyst and thus produce NO2 which adds to the NO2 generated in the oxidation catalyst.

According to a preferred further development, additionally or alternatively the ratio among the constituents is established depending on the amount of NO2 which is generated in the oxidation catalyst. The oxidation catalyst can generate NO2 for both the passive oxidation of soot in the particulate filter as well as for the selective catalytic reduction in the SCR catalyst. The NO2 generated in the particulate filter is reacting back to NO on the soot so that the amount of NO2 and NO formed in the particulate filter is strongly dependent on the condition of the particulate filter, e.g. the amount of soot and on the reaction temperature, i.e. the exhaust temperature, wherein the selected specific chemical reaction has a higher probability to be performed than each single one of the other chemical reactions.

The ratio among the constituents can additionally or alternatively be established depending on the amount of sulphur which is adsorbed in the oxidation catalyst. The oxidation catalyst absorbs sulphur at lower exhaust gas temperatures and releases the sulphur at temperatures above 350° C. If operating conditions of the engine let the oxidation catalyst adsorb a lot of sulphur contained in the exhaust gas, the NO2 formation in the oxidation catalyst will be poisoned.

Favourably additionally or alternatively, the ratio among the constituents can be established depending on the amount of ammonia which is provided in the SCR catalyst. On an SCR catalyst ammonia is reacting with NOx to form nitrogen. On vehicles urea is injected into the exhaust gas and by the exhaust temperature urea is thermolyzed and/or hydrolyzed to ammonia in the exhaust gas and on the catalyst.

Additionally or alternatively, the space velocity of the exhaust gas in the oxidation catalyst and/or the portion of exhaust gas which can be fed into the bypass line and the portion of exhaust gas which can be fed into the oxidation catalyst can be controlled depending on operating parameters of the engine and/or on operating parameters of one or more catalysts arranged in the exhaust aftertreatment system. Consequently, a NOx or NO2 sensor can be replaced by a virtual sensor which uses a model of the engine and the exhaust aftertreatment system to calculate the relevant parameters, particularly the NO2 and NO content in the exhaust gas at the inlet of the SCR catalyst. Preferably parameters are available such as exhaust gas flow, temperatures in the oxidation catalyst and particulate filter, NO and NO2 flow from the engine, soot flow from the engine and/or soot load in the particulate filter. Some of the parameters can be measured and other parameters can be calculated from other sensors and engine parameters.

According to another aspect of the invention an exhaust aftertreatment system comprising at least an oxidation catalyst and a SCR catalyst arranged in an exhaust line of an engine is proposed wherein the flow of the exhaust gas through the oxidation catalyst is controllable depending on at least one desired ratio among one or more pairs of the one or more constituents, wherein the exhaust gas enters the selective-catalytic-reduction catalyst with the at least one desired ratio among the one or more pairs of the one or more constituents; the at least one desired ratio among the one or more pairs of the one or more constituents at the input of the selective-catalytic-reduction catalyst is established; a predetermined reaction temperature or temperature range is selectable and is established in the selective-catalytic-reduction catalyst; the probability that one specific chemical reaction out of said group of possible different chemical reactions between the one or more constituents of the exhaust gas and the catalyst material in the selective-catalytic-reduction catalyst will take place is increased by inputting the exhaust gas into the selective-catalytic-reduction catalyst, wherein said reaction probability for said selected specific chemical reaction is higher than the reaction probability for each one of the other chemical reactions which are not selected.

Preferably the exhaust aftertreatment system comprises a sensing unit for controlling the flow of the exhaust gas through the oxidation catalyst depending on at least one desired ratio among one or more pairs of the one or more constituents, wherein the exhaust gas enters the selective-catalytic-reduction catalyst with the at least one desired ratio among the one or more pairs of the one or more constituents; and at least one unit coupled to the oxidation catalyst and/or a particulate filter for establishing at least one desired ratio among the one or more pairs of the one or more constituents at the input of the selective-catalytic-reduction catalyst, wherein a predetermined reaction temperature or temperature range is selected and established in the selective-catalytic-reduction catalyst.

Said flow control through the oxidation catalyst can be achieved by an external bypass line which circumvents the oxidation catalyst. A controllable valve can favourably vary the portion of exhaust gas flowing through the oxidation catalyst and generating an oxide, e.g. NO2, and the portion of exhaust gas flowing through the bypass line. Generally, the bypass line can also be provided with an oxidation catalyst, e.g. a smaller or less efficient one, so that the oxide generation is mainly performed in the bypassed main oxidation catalyst.

Alternatively or additionally, the flow control can be achieved by controlling the space velocity of the exhaust gas flowing through the oxidation catalyst. Preferably one or more closing units can be provided which close or open channels or areas in the oxidation catalyst thus reducing or increasing the catalyst volume accessible for the exhaust gas and hence increasing or decreasing the space velocity. An increase in space velocity results in a decrease in oxidized matter and a decrease in space velocity results in an increase of oxidized matter.

Preferably a particulate filter can be arranged in between the oxidation catalyst and the SCR catalyst. Soot trapped in the particulate filter can be oxidized by the oxidized matter, particularly NO2, generated in the oxidation catalyst.

A sensing unit can be provided for sensing the amount of NO2 contained in the exhaust entering the SCR catalyst. The sensing unit can comprise a control unit for controlling a valve of a bypass line external to the oxidation catalyst and/or for controlling one or more closing units in the oxidation catalyst for opening or closing parts of the oxidation catalyst and consequently varying the space velocity in the oxidation catalyst. The sensing unit can favourably comprise a NO2-sensitive sensor arranged in the exhaust line downstream of the particulate filter. Optionally, the sensing unit can comprise a device which calculates the amount of NO2 and/or the ratio of NO2/NO entering the SCR catalyst depending on operating parameters of the engine and/or on operating parameters of one or more catalysts arranged in the exhaust aftertreatment system, thus providing a virtual sensor.

According to another aspect of the invention a computer program storable on a computer readable medium, comprising a program code for use in a method comprising at least the steps of: (a) controlling the flow of exhaust gas through an oxidation catalyst depending on at least one desired ratio among one or more pairs of the one or more constituents, wherein the exhaust gas enters a selective-catalytic-reduction catalyst (70) with the at least one desired ratio among the one or more pairs of the one or more constituents; (b) establishing the at least one desired ratio among the one or more pairs of the one or more constituents at an input of the selective-catalytic-reduction catalyst; (c) selecting a predetermined reaction temperature or temperature range and establishing it in the selective-catalytic-reduction catalyst; (d) increasing the probability that one specific chemical reaction out of said group of possible different chemical reactions between the one or more constituents of the exhaust gas and the catalyst material in the selective-catalytic-reduction catalyst will take place by inputting the exhaust gas into the selective-catalytic-reduction catalyst, wherein said reaction probability for said selected specific chemical reaction is higher than the reaction probability for each one of the other chemical reactions which are not selected.

BRIEF DESCRIPTION OF THE DRAWINGS

The present invention may best be understood from the following detailed description of the embodiments, but not restricted to the embodiments, wherein is shown schematically.

Figure 1:
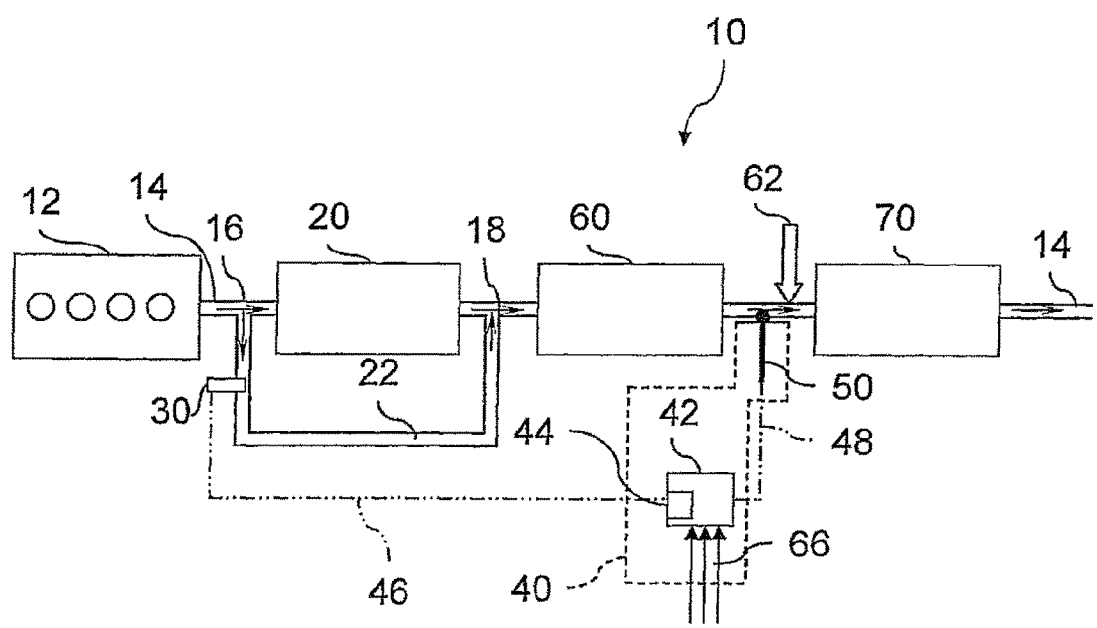
FIG. 1 a first embodiment of an exhaust aftertreatment system according to the invention.

In the drawings, equal or similar elements are referred to by equal reference numerals. The drawings are merely schematic representations, not intended to portray specific parameters of the invention. Moreover, the drawings are intended to depict only typical embodiments of the invention and therefore should not be considered as limiting the scope of the invention.

DETAILED DESCRIPTION

Figure 2A:
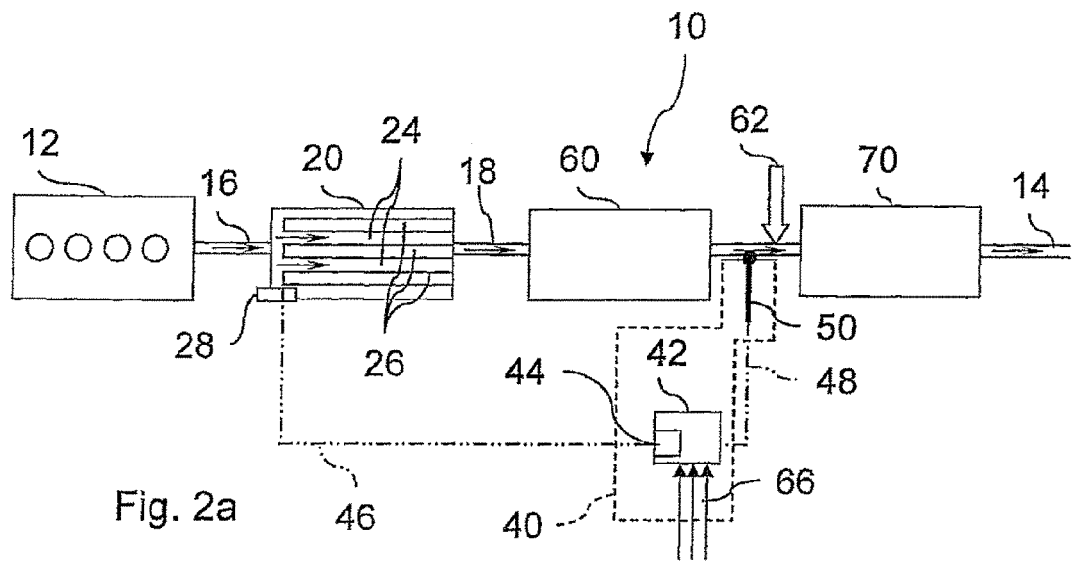
FIGS. 2a, 2b a second embodiment of an exhaust aftertreatment system according to the invention with a variable space velocity of an exhaust gas in an oxidation catalyst in different operation modes.
Figure 2B:
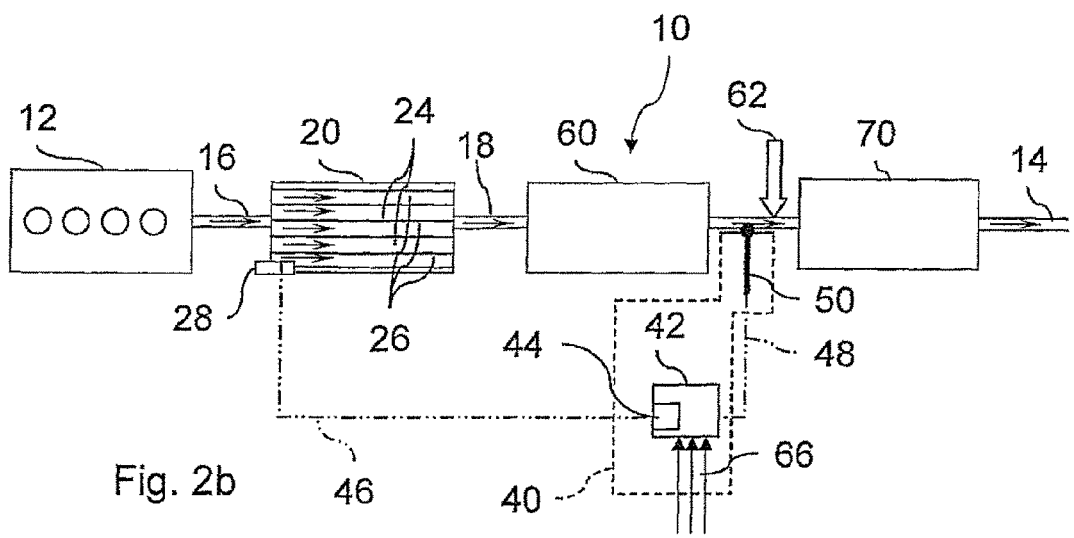

FIG. 1 and FIGS. 2a, 2b depict preferred embodiments of an exhaust aftertreatment system 10 according to the invention. In successive order an oxidation catalyst 20, a particulate filter 60 and a SCR catalyst 70 are arranged in an exhaust line 14 of an engine 12.

For all embodiments shown, the oxidation catalyst 20 can be typically coated with a catalytically active material and is provided to oxidize one or more constituents of the exhaust gas such as hydrocarbons (HC), carbon monoxide (CO), and nitrogen monoxide (NO). The efficiency of the oxidation depends on the reaction temperature, i.e. the exhaust temperature, space velocity of the exhaust gas flow in the oxidation catalyst 20 and the exhaust gas composition. The temperature in the exhaust line 14, i.e. in the oxidation catalyst 20, particulate filter 60 and the SCR catalyst 70 can be controlled with measures (hot shown) known in the art, such as HC injection into the exhaust gas, late post-injections in the engine 12, providing a catalytic or flame burner and the like, for e.g. providing regeneration of the particulate filter 60, controlling the activity of the oxidation catalyst 20 and achieving favourable temperatures in the selective catalytic reduction (SCR) in the SCR catalyst 70. Additionally, HC injection can be used to control the NO2 content in the exhaust aftertreatment system 10.

The oxidation catalyst 20 is preferably used to generate a sufficient amount of NO2 for passive oxidation of soot trapped in the particulate filter 60 according to the reaction $NO + \frac{1}{2}O_2 \rightarrow NO_2$.

The main function of the particulate filter 60 is to trap particulate matter such as soot and ashes contained in the exhaust gas. A typical vehicular exhaust aftertreatment system 10 requires one to several 100 000 km driving to fill the particulate filter 60 with ashes, and the particulate filter 60 can be emptied from ash by demounting the particulate filter 60 at service. To fill the particulate filter 60 with soot requires only one to several 1000 km driving. However, the soot can be burnt to CO2 which can be done during operation of the vehicle.

For some applications it may be beneficial to coat the particulate filter 60 with a catalytically active material including the properties of an oxidation catalyst into the particulate filter 60 as disclosed in WO2002/14657A1. For proper function of the particulate filter 60 it is recommended to control the amount of soot trapped in the particulate filter 60. Regeneration of the particulate filter 60 may be accomplished in various ways known in the art. Preferably, NO2 can be used for passive oxidation of the trapped soot according to the reaction is $2NO_2 + C \rightarrow 2NO + CO_2$.

For an efficient passive regeneration it is necessary to establish the exhaust gas temperature above a critical limit, preferably above 250° C., and to provide an adequate amount of NO2. The amount of NO2 in the exhaust gas fed into the particulate filter 60 can be increased by the oxidation catalyst 20 by oxidation of NO to NO2.

Depending on the engine 12 emissions of soot and NOx (NOx=NO, NO2), the passive burning of soot can keep the soot level in the particulate filter 60 low at exhaust temperatures above 250° C. For some engine emissions however, the ratio of NOx/soot is too low for burning the soot by NO2. Alternative to passive burning of soot the soot can be removed by burning it by oxygen at high temperatures, preferably at about 600° C. This can be achieved by either providing a burner in the exhaust aftertreatment system 10 or by adding fuel to the exhaust gas which is burnt on an oxidation catalyst upstream of the particulate filter 60. Activation of the burner or adding fuel is done in a regeneration phase which typically is in the range of one to three quarters of an hour.

Downstream of the particulate filter 60 and upstream of the SCR catalyst 70 the exhaust gas contains one or more constituents as NO and NO2, which can be deoxidized in the SCR catalyst 70.

The main task of the SCR catalyst 70 is to reduce NOx, i.e. NO and NO2, with a reductant to nitrogen gas N2 and water H2O. On the SCR catalyst 70 ammonia NH3 reacts with NOx to form nitrogen. Usually, on vehicles urea is injected into the exhaust gas, and by the exhaust gas temperature urea is thermolyzed or hydrolyzed into NH3 in the exhaust gas and the catalyst 70. The reductant, e.g. NH3 or urea, is added to the exhaust gas upstream of the SCR catalyst 70, for instance by an injector 62 (indicated by a broad arrow upstream of the SCR catalyst 70). The efficiency of the SCR catalyst 70 is strongly dependent on the exhaust gas temperature, the space velocity of the exhaust gas and the NO2/NO ratio in the exhaust gas which enters the SCR catalyst 70.

Depending on the kind of NOx there are three principal chemical reactions possible:

  (a)

  (b)

  (c)

The reaction (b), i.e. the exhaust gas contains NO2 and NO in equal or at least nearly equal amounts, has the highest efficiency and is efficient from exhaust temperatures below 200° C. and above. Reaction (a), i.e. NOx in the exhaust gas comprises or consists mainly of NO, becomes efficient at 300° C., and for reaction (c), i.e. NOx in the exhaust gas comprises or consists mainly of NO2, the efficiency is lower than for reaction (a) on vanadium based SCR-catalyst while it is on zeolite-based catalyst more efficient than reaction (a) but not as efficient as reaction (b). Further, on zeolite-based catalysts an unfavourable competitive reaction to reaction (c) exists which is generating the greenhouse gas N2O:

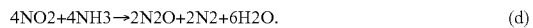  (d)

Hence, for high efficiency a NO2/NOX ratio of 0.5 (i.e. NO2/NO ratio of 1) into the SCR catalyst 70 is advantageous, whereas a higher ratio of NO2/NO should be avoided due to the lowest efficiency on vanadium catalyst or to avoid N2O formation if a zeolite is used. Further, the passive regeneration of the particulate filter 60 benefits from a high NO2 concentration. Therefore, the ideal NO2/NO ratio is 1, so a ratio at least close to 1 is favourable and preferably not exceeding 1, i.e. particularly a ratio is chosen of NO2/NO=0.8±0.2, preferably NO2/NO=0.9±0.1, most preferably NO2/NO=0.95±0.05. If the NO2/NO ratio is close to 1, then reaction (b) has the highest probability to be performed.

Figure 4:
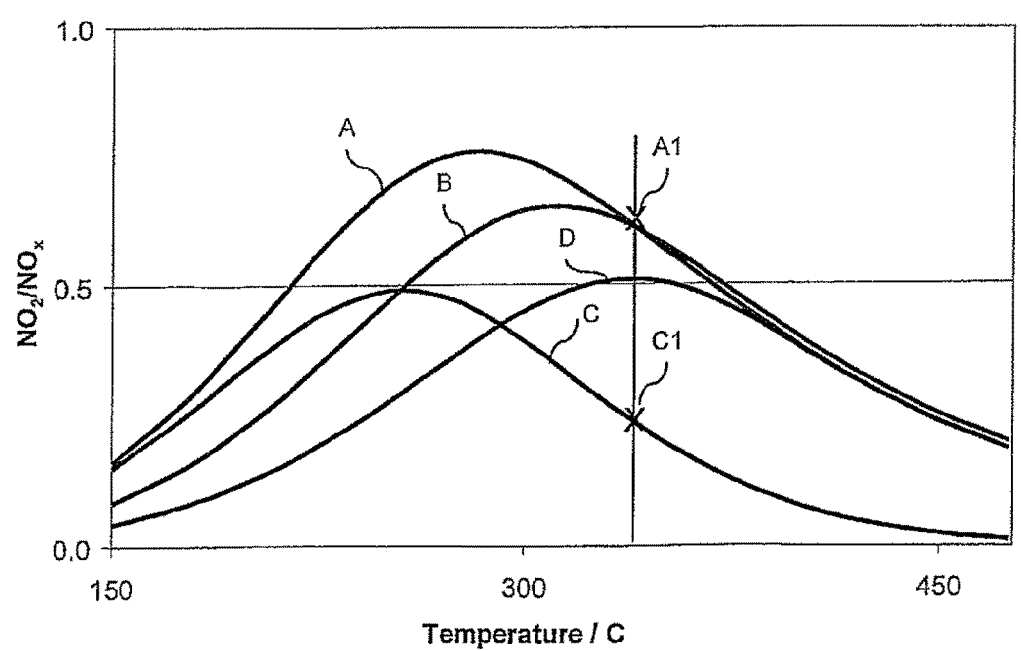
FIG. 4 temperature dependent ratios of NO2/NOx with different soot load and sulphur load.

As can be seen in FIG. 4 the NO2 formation will depend on the exhaust gas mass flow and the temperature of the oxidation catalyst 20. FIG. 4 illustrates the NO2/NOX ratio as a function of the reaction temperature in the oxidation catalyst 20 downstream of the oxidation catalyst 20 and the particulate filter 60. Besides the flow and temperature dependency, the oxidation catalyst 20 adsorbs sulphur, which can be contained in the exhaust gas, at lower temperatures and releases the sulphur at temperatures above 350° C. If driving conditions let the oxidation catalyst 20 adsorb a lot of sulphur, the NO2 formation will be poisoned. The NO2 content after the particulate filter 60 will also depend on the condition of the particulate filter 60. The particulate filter 60 can have an oxidation catalyst coated so that there is a NO2 formation there too. Then NO2 is reacting back to NO on the soot and that will depend on the amount of soot in the particulate filter 60 and on temperature.

Particularly, curve A illustrates the temperature dependence of the NO2/NOX ratio with a low soot load in the particulate filter 60, indicating a maximum of about 0.75 at between 250° C. and 300° C. Curve B represents a high exhaust flow and low soot load indicating a lower maximum of about 0.6 at a higher temperature of about 300° C. than curve A. Curve C represents a high soot load in the particulate filter 60, indicating a even more lowered maximum close to 0.5 at a lower temperature of about 250° C. compared with curves A and B and curve D represents a low soot load and sulphur poisoning of the oxidation catalyst 20, indicating a low maximum at about 0.5 at a higher temperature between 300° C. and 400° C. compared with curves A, B and C.

When the engine 12 is started, there is no soot load at the beginning and consequently there is no soot burnt in the particulate filter 60. However, soot is emitted by the engine 12 and a soot filter cake starts to build up in the particulate filter 60. The filter cake of soot is built up to a thickness which corresponds to an equilibrium where the rate at which soot is collected is equal to the rate of soot reacting with NO2. At higher loads, with typically higher exhaust temperatures, this reaction goes faster which means that the amount of soot in the particulate filter 60 is smaller than at lower loads. The time to reach equilibrium is in the range of minutes to hours. For instance, going from a low load, e.g. an hour city driving, to a high load means that the filter cake is much thicker in the beginning of the high load phase than after half an hour driving.

Favourably, the preferred control method can inherently consider the soot load in the particulate filter 60 as well as the sulphur load in the oxidation catalyst 20.

Preferably, the NO2/NO ratio is kept at a predetermined value for varying load conditions of the engine 12. Preferably the ratio is chosen close to 1 and preferably not exceeding 1, e.g. NO2/NO=0.8±0.2, preferably NO2/NO=0.9+0.1, most preferably NO2/NO=0.95±0.05. This can be preferably done by controlling the flow through the oxidation catalyst 20 in a way, particularly with the help of a NO2 sensor, to let enough exhaust flow through the bypass line 22 so that the ratio NO2/NOX does not exceed 0.5 (i.e. ratio NO2/NO does not exceed 1) before entering the SCR catalyst 70. In this way the passive soot oxidation (C+2NO2→CO2+2NO) can be achieved as well as the fastest and most selective SCR reaction (2NH3+NO+NO2→2N2+3H2O) is maximised and the slower and nonselective reactions (e.g. 3NO2+4NH3) are minimised which will minimise the emissions of NO2 and N2O. Preferably the wanted ratio NO2/NO not exceeding 1 is established so that the probability for the selected chemical reaction (b) to be performed surmounts the probability to be performed for each single one of the other chemical reactions. As this reaction has also a high efficiency, if both constituents NO2 and NO are present, particularly with a NO2/NO ratio close to 1, this reaction will automatically be triggered at a high rate. The reaction rate corresponds to the probability of the particular chemical reaction which is also increased.

The control can be favourably achieved with the help of a NO2 sensor 50 placed downstream of the particulate filter 60 as shown in the FIG. 1. Optionally, the sensor 50 can be placed downstream of the SCR catalyst 70 providing a slower response. The NO2 sensor 50 can be replaced by a virtual sensor which calculates the NO2 content from available parameters such as exhaust flow, temperatures in oxidation catalyst 20 and particulate filter 60, NO and NO2 flow from engine 12, soot flow from engine 12 and soot load in particulate filter 60. Some of the parameters can be measured and some calculated from other sensors and engine parameters.

The preferred control method can change the flow through the oxidation catalyst, e.g. by changing the valve settings of a bypass line 22 dependent on the NO2 and NOx sensor signals with e.g. a standard PID control (PID=Proportional-Integral-Derivative). An open loop control can be used by constructing a 4-dimensional map based on exhaust gas mass flow, temperature in oxidation catalyst 20, sulphur content in the oxidation catalyst 20 and soot load in the particulate filter 60 as input parameters. The 4-dimensional map can be constructed based on such curves as shown in FIG. 4 for example. However, the two parameters soot load and sulphur content for a sensor 50 should be calculated in a similar way as for the virtual sensor.

A virtual NOx sensor is a rather complex model and comprises or consists preferably of following submodels which are given in quotes:

"Engine-out NOv": The amount of NOx at the outlet of the engine can be estimated by a sensor or a model with following inputs for example: load or fuel amount, timing for fuel injection, engine speed, intake air pressure, intake air temperature, EGR (EGR=exhaust gas recycling) amount and intake air humidity. These are parameters of the engine and sensed values. There are several ways to build the model. It can be map-based where all or at least some of the relevant parameters are, or can be, corrected by correction factors laid down in the map. It can also be a model built on a neural network as base.

"Exhaust gas flow": The exhaust gas flow can be measured, or derived from the measured air intake flow and the fuel amount, or from the calculated air intake flow from engine speed, intake air pressure, intake air temperature, EGR amount and volumetric efficiency of the engine.

"Exhaust gas flow in oxidation catalyst": The exhaust gas flow in the oxidation catalyst 20 can be measured or calculated from the valve opening.

"Temperature in catalyst": The temperature can e.g. be measured upstream of the oxidation catalyst 20. By applying an appropriate signal filter the measured value together with the exhaust gas flow into the oxidation catalyst 20 as a parameter can represent the actual catalyst temperature. Alternatively the temperature can be calculated by using a simple heat balance.

"Sulphur in oxidation catalyst": The sulphur content in the oxidation catalyst 20 is preferably calculated. For instance the calculation can be derived from the parameters in parentheses: (sulphur content in catalyst)=(sulphur content in catalyst a second before)+(sulphur adsorbed from exhaust during a second)−(sulphur desorbed during a second). The parameter "sulphur adsorbed from exhaust during a second" is the sulphur content in the fuel and lubrication oil consumed during the said second multiplied with a factor, wherein the factor is between 0 and 1 and has a temperature dependency which can e.g. be derived from a map containing temperature dependent values of the factor. The parameter "sulphur desorbed during a second" is the sulphur content in the oxidation catalyst 20 one second before multiplied with another temperature dependent factor which can be derived in the same way as the first factor described above.

"NQ7 formation in catalyst": The NO2 formation in the oxidation catalyst 20 can be derived from interpolating in a 3-D map based on the parameters exhaust gas flow, temperature in catalyst and sulphur content. It can also be calculated using a physical model with sulphur content, temperature, exhaust gas flow and oxygen concentration as input parameters. The model can be e.g. a specific NO2 formation rate which is ki-Cuo'Coi and an NO2 decomposition rate which is k2-CNo2, where k-i and k2 are temperature dependent and sulphur-content dependent parameters and C is the concentration of NO, NO2 and O2, respectively. The specific rate is integrated over the catalyst volume. If there is a wide range of the HC content in the engine's working area or if an HC-injector is used, then the HC level is also an input parameter to the model, e.g. as a denominator for the specific rates (1+Ka-CHc)—Ka is a (temperature dependent) equilibrium constant.

"NO2 out from the particulate filter": The amount NO2 which is released from the particulate filter 60 is the difference between the amount of NO2 fed into the particulate filter 60, NO2 formed in the particulate filter 60 (which is zero if no catalytic layer is provided in the particulate filter 60 for NO2 generation) and NO2 consumed by soot in the particulate filter 60. NO2 formed in the particulate filter 60 can be calculated in the same manner as the NO2 formed in the oxidation catalyst 20 (see above), preferably a physical model. NO2 consumed by soot in the particulate filter 60 is proportional to the amount of soot in the particulate filter 60 and can be expressed as a specific rate k3-CNO2-CSOot. Again, k3 is a temperature dependent parameter and C the respective concentration of NO2 and soot.

"Soot load in particulate filter": The soot load in particulate filter 60 can be derived from a measured pressure drop over the particulate filter 60 and/or by applying a model: (soot in the particulate filter 60 at a current time)=(soot in the particulate filter 60 at a time before the current time)+(soot emitted by the engine during the current time)−(soot burnt by NO2 during the current time). Soot burnt by NO2 during the current time is given by the "NO2 out from particulate filter" model, soot emitted by the engine during the current time is given from a soot sensor or a similar model as the "Engine-out NOx" model. The usage of a pressure drop for calculation of a soot amount in the particulate filter 60 can introduce some errors due to the fact that the soot characteristic is changing with time. Therefore, it is preferred to use a model for calculating the soot load and use the pressure drop as a qualitative check of the model.

By controlling the flow of the exhaust gas through the oxidation catalyst 20 depending on the desired ratio among the constituents, particularly the ratio NO2/NO, and by establishing the ratio among the constituents so that at a given reaction temperature in the SCR catalyst 70 one specific chemical reaction, particularly reaction (b) is selected out of a group of possible chemical reactions (a), (b), (c), which can take place among the constituents of the exhaust gas and the catalyst material in the SCR catalyst 70, an efficient removal of NO, NO2 and—at the same time—of soot is achieved.

Referring now particularly to FIG. 1 which depicts a preferred embodiment according to the invention a first flow control device is provided in order to control the exhaust flow through the oxidation catalyst 20. The flow control device is designed as a controllable valve 30 which controls the exhaust gas flow by dividing it into a first portion entering the oxidation catalyst 20 and a second portion entering into a bypass line 22. Both flow portions are mixed again upstream of the particulate filter 60. The bypass line 22 is provided external to the oxidation catalyst 20 through which exhaust gas can circumvent the oxidation catalyst 20. The bypass line 22 starts at a first branching point 16 upstream of the oxidation catalyst 20 and ends at a second branching point 18 downstream of the oxidation catalyst 20.

The flow of the exhaust gas through the oxidation catalyst 20 is controllable depending on a desired ratio among members of the constituents of the exhaust gas, particularly between NO2 and NO. A predetermined ratio of NO2/NO is maintained over the operation variations of the engine 12. Additionally, according to another favourable embodiment (not shown) an oxidation catalyst can be provided in the by-pass line 22 (FIG. 1), thus allowing to vary the space velocity of the arrangement.

Referring now back to FIG. 4, by way of example point A1 of curve A indicates a stationary condition at a high engine load with a low soot load in the particulate filter 60 at about 350° C. Having a thick filter cake corresponds to point C1 at curve C. A control method based only on temperature does not take into account the big difference in the available NO2 amount. The bypass line 22 would be opened to reduce the NO2 content with approximately % of the exhaust gas bypassed within one minute according to a typical time scale for the temperature variation of the oxidation catalyst 20. However, during this one minute the soot load in the particulate filter 60 has not changed much so that the NO2/NO ratio would be much lower than the preferred ratio. Considering the influence of the sulphur poisoning of the oxidation catalyst 20 (curve D), if the control method would only take into account the temperature, the amount of NO2 would be so low that under equilibrium conditions a filter cake thickness could built up which could become critical for the particulate filter 60. Favourably, the preferred control method inherently can take into account the time scale for the change of the soot toad in the particulate filter 60 as well as the influence of sulphur in the oxidation catalyst 20.

Between the particulate filter 60 and the SCR catalyst 70 a sensing unit 40 is provided for sensing the amount of NO2 contained in the exhaust entering the SCR catalyst 70. The sensing unit 40 comprises a NO2-sensitive sensor 50 arranged in the exhaust line 14 downstream of the particulate filter 60 and a control unit 42 connected to the sensor 50 and the valve 30 via data lines 48 and 46 respectively. Optionally a device 44 can be coupled to the control unit 42 to calculate the amount of NO2 entering the SCR catalyst 70 depending on parameters 66, such as operating parameters of the engine 12 and/or on operating parameters of one or more catalysts 20, 60, 70 arranged in the exhaust aftertreatment system 10, as described above.

FIGS. 2a and 2b depict another preferred embodiment of the invention wherein the control of the flow through the oxidation catalyst 20 is replaced by varying the space velocity of the exhaust gas within the oxidation catalyst 20. The overall configuration of the exhaust aftertreatment system 10 is the same as described in FIG. 1. In order to avoid unnecessary repetitions, mainly the differences between the two embodiments of FIGS. 2a and 2b related to the flow control through the oxidation catalyst 10 are discussed. For equal components and arrangements reference is made to the description of FIG. 1.

Valve 30 of the embodiment of FIG. 1 is replaced in FIGS. 2a and 2b by units controlling the space velocity of the exhaust gas in the oxidation catalyst 20, such as a closing unit 28 coupled to the oxidation catalyst 20. By way of example the oxidation catalyst 20 can be formed as a monolith of a honeycomb type with channels 24, 26 through which the exhaust flows from the catalyst inlet to the catalyst outlet. The closing unit 28 can close or open channels 26 in the oxidation catalyst 20 when switched between its particular operation positions. The total number of the channels 24, 26 available for the exhaust gas in the oxidation catalyst 20 can be varied with the help of the closing unit 28. If the channels 26 are closed by the closing unit 28 in a first operation position (FIG. 2a), the exhaust gas flow is forced through channels 24, thus decreasing the available catalyst volume for the exhaust gas. In this case, only a little amount of NO2 is produced. If the closing unit 28 is switched to another operating position channels 24 as well as channels 26 are open. The exhaust gas can flow through all channels 24 and 26, providing more catalyst material for oxidizing the exhaust gas and yielding an increased NO2 output (FIG. 2b).

Figure 3:
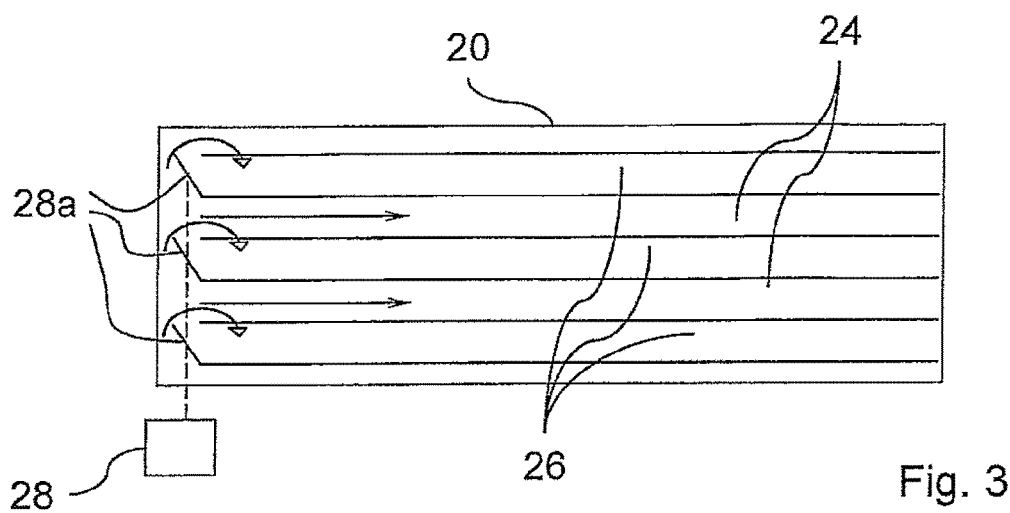
FIG. 3 a detail of a preferred oxidation catalyst combined with a preferred closing unit.

FIG. 3 schematically depicts the oxidation catalyst 20 illustrated in FIGS. 2a and 2b. The oxidation catalyst 20 comprises a closing unit 28 which encompasses a multitude of pivoting plates 28a which can be tilted to open or close the channels 26. In FIG. 3 the plates 28a are moving from the open position to the close position which is indicated by curved arrows at each plate 28a.

Additionally or alternatively, the closing unit 28 can comprise one or more perforated apertures (not shown) with a multitude of openings which can be moved longitudinally over the front face of the oxidation catalyst 20. Favourably, two such apertures with different spacings between the openings can be arranged in an overlaying manner at the front face of the oxidation catalyst 20 and moved longitudinally relative to one another so that in one position some openings of the first aperture overlay with openings of the other overlays and other openings of the first openings overlay are closed by the other aperture whereas in another position more or all openings give way for the exhaust gas.

Additionally or alternatively, the effective cross section of the individual channels 24, 26 can be varied with the help of a closing unit 28 (not shown) as described before.

Additionally (not shown), the channels 24 and 26 can exhibit e.g. different diameters and/or be furnished with different catalytic material and/or equipped with different densities of the catalytic material. It is also possible to provide a density gradient of the catalytic material in the channels 24 and/or channels 26. The density gradient can be oriented at a right angle to the exhaust gas flow from one side of the oxidation catalyst 20 to the other. If a closing unit 28 covers a part of the channels 24 and/or 26 of the oxidation catalyst 20 and the cover is removed the change in catalytic reactivity is stronger than the increase or decrease in channel volume.

Another embodiment (not shown) of a preferred closing 28 is to provide a movable plate of the kind of a camera lens diaphragm which varies the effective surface of the catalyst 20 exposed to the exhaust gas.

Another embodiment (not shown) of a preferred oxidation catalyst 20 is to provide an inlet design which distributes the exhaust gas to the whole area at high exhaust gas velocities and concentrates it to the centre at low velocities.

The closing unit 28 is coupled to a sensing unit 40 which is provided for sensing the amount of NO2 contained in the exhaust entering the SCR catalyst 70 and receive control signals from the control unit 42 of the sensing unit 40 via data lines 46. The NO2-sensitive sensor 50 arranged in the exhaust line 14 downstream of the particulate filter 60 is coupled to the control unit 42 via data line 48. The closing unit 28 can be combined with and/or formed as flow guides in the oxidation catalyst 20.

Optionally, the sensing unit 40 can comprise a device 44 which calculates the amount of NO2 entering the SCR catalyst 70 depending on operating parameters of the engine 12 and/or on operating parameters of one or more catalysts 20, 60, 70 arranged in the exhaust aftertreatment system 10 thus forming a virtual NO2-sensor.

Particularly, the virtual sensor can be part of a computer program comprising a software code adapted to perform a preferred control method or for use in a control method according to at least one of the features described above when said program is run on a programmable microcomputer and can particularly be downloaded to a support unit or one of its components when run on a computer which is connected to the internet.

The preferred control methods well as the exemplified preferred exhaust aftertreatment systems allow to control and particularly minimize the emissions of NO2 and N2O as well as soot within a wide load-speed work area of an engine with a good soot combustion by NO2 without the necessity to add additional fuel into the exhaust aftertreatment systems for reducing emissions.

Generally, the both embodiments of the invention described above allow for operating the exhaust gas aftertreatment system under real time conditions. This is possible for the embodiment related to the bypass line 22 exemplified in FIG. 1 and the embodiment related to varying the space velocity exemplified in FIGS. 2a, 2b, and 3.

Figure 5:
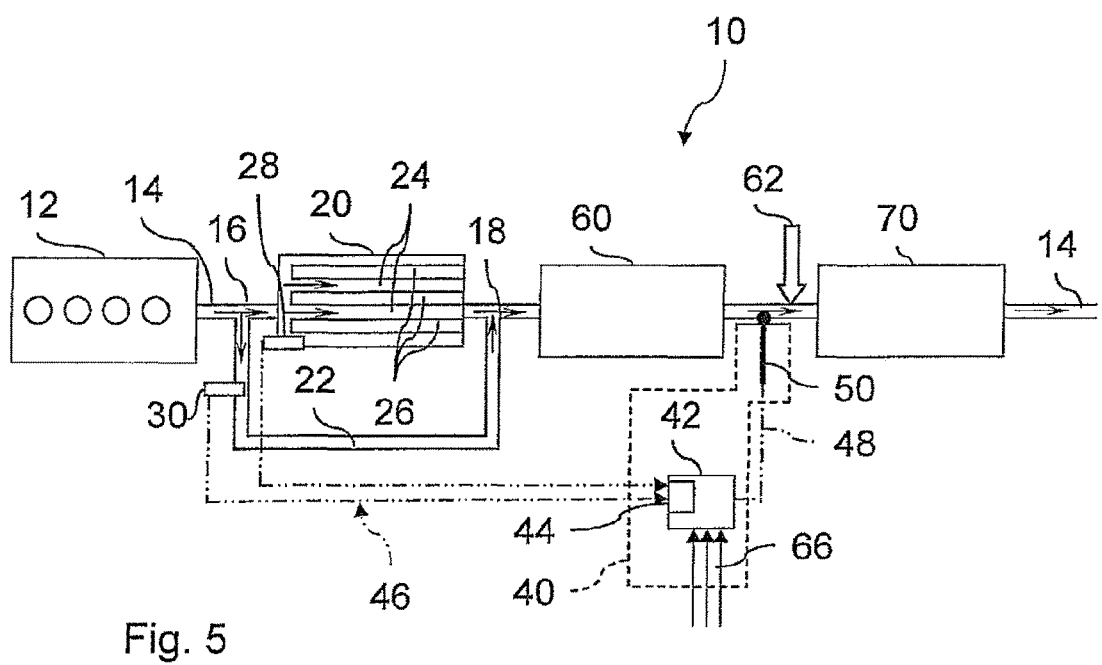
FIG. 5 a third embodiment of an exhaust aftertreatment system according to the invention combining a variable space velocity of an exhaust gas and a bypass line.

According to a favourable further embodiment, FIG. 5 illustrates a combination of both embodiments depicted in FIGS. 1 and 2a, 2b, and 3 comprising a preferred exhaust aftertreatment system 10 equipped with a bypass line 22 which circumvents the oxidation catalyst 20 being arranged upstream of a particulate filter 60, wherein the oxidation catalyst 20 exhibits a variable space velocity to control the creation of a certain NO2/NO gas mixture required as input for the subsequent SCR catalyst 70. For further details of the arrangement reference is made to the descriptions of FIGS. 1, 2a, 2b and 3.

In order to optimize the real time control of the NO2/NO ratio it is also possible to couple a buffer to the bypass line 22 (FIG. 1, FIG. 5). Particular situations or engine modes of operation can occur where certain amounts of the produced exhaust gas cannot be processed in a good way according to the invention because the gas volume is too large and/or the composition of the gas mixture is too unbalanced. In such situations it can be favourable to store certain amounts of the exhaust gas in a controlled way in an intermediate buffer connected or connectable to the exhaust gas system 10 upstream and/or downstream the catalyst 20. This buffer could or should be used in an active way by either taking away excess exhaust gas volumes from or to shoot in missing exhaust gas volumes into the exhaust gas system in order to optimize the mixture of compounds needed to stabilize the wanted ratio of NO2/NO gas mixture over a longer period of time. This buffer could be a fixed buffer where the exhaust gas is usually stored under pressure that is larger than the operating (average) pressure within the exhaust gas system (the buffer could be connected to a pump that puts exhaust gas in into the buffer, and a valve that lets gas out of the buffer). Alternatively, a buffer with flexible walls (like a balloon) could be used.

The invention claimed is:

1. A control method for controlling an NO2/NO ratio in an exhaust aftertreatment system of an engine in which constituents of the exhaust gas are oxidized in an oxidation catalyst and constituents of the exhaust gas are deoxidized by a group of possible chemical reactions of different type between the constituents of the exhaust gas and catalytic material arranged in a selective-catalytic-reduction catalyst, wherein the exhaust gas flows from the oxidation catalyst to the selective-catalytic-reduction catalyst, comprising:
controlling the flow of the exhaust gas through the oxidation catalyst depending on at least one desired ratio among a pair of the constituents, wherein the exhaust gas enters the selective-catalytic-reduction catalyst with the at least one desired ratio among the pair of the constituents;
establishing the at least one desired ratio among the pair of the constituents at the input of the selective-catalytic-reduction catalyst;
selecting a predetermined reaction temperature or temperature range and establishing it in the selective-catalytic-reduction catalyst wherein the probability is increased that one specific chemical reaction out of the group of possible different chemical reactions between the constituents of the exhaust gas and the catalyst material in the selective-catalytic-reduction catalyst will take place by inputting the exhaust gas into the selective-catalytic-reduction catalyst, wherein the reaction probability for the selected specific chemical reaction is higher than the reaction probability for each one of the other chemical reactions which are not selected; and
establishing the ratio among the constituents depending on an amount of soot load in a particulate filter arranged between the oxidation catalyst and the selective-catalytic-reduction catalyst and depending on an amount of NO2 which is generated in the particulate filter.

2. The method according to claim 1, comprising controlling the flow of the exhaust gas through the oxidation catalyst by splitting the flow in a first portion flowing through the oxidation catalyst and a second portion flowing through a bypass line circumventing the oxidation catalyst.

3. The method according to claim 1, comprising controlling the flow of the exhaust gas through the oxidation catalyst by varying a space velocity of the exhaust gas in the oxidation catalyst.

4. The method according to claim 1 wherein the ratio among the constituents is a ratio of NO2/NO close to 1.

5. The method according to claim 1, wherein the ratio among the constituents is established depending on the amount of NO2 which is generated in the oxidation catalyst.

6. The method according to claim 1, wherein the ratio among the constituents is established depending on the amount of sulphur which is adsorbed in the oxidation catalyst.

7. The method according to claim 1, wherein the ratio among the constituents is established depending on the amount of ammonia which is provided in the selective-catalytic-reduction catalyst.

8. The method according to claim 1, wherein the ratio of exhaust gas which is fed into the bypass line and exhaust gas which is fed into the oxidation catalyst is calculated depending on operating parameters of the engine and/or on operating parameters of one or more catalysts arranged in the exhaust aftertreatment system.

9. The method according to claim 1, comprising controlling temperature in an exhaust line comprising the oxidation catalyst, a particulate filter, and the selective-catalytic reduction catalyst.

10. The method according to claim 1, comprising establishing the ratio among the constituents depending on the amount of soot flow from the engine.

11. An exhaust aftertreatment system for controlling an NO2/NO ratio in exhaust gas from an engine, comprising:
an oxidation catalyst in which constituents of the exhaust gas are oxidized;
a diesel particulate filter;
a selective-catalytic-reduction catalyst in which constituents of the exhaust gas are deoxidized by a group of possible chemical reactions of different type between the constituents of the exhaust gas and catalytic material arranged in the selective-catalytic-reduction catalyst, wherein the exhaust gas flows from the oxidation catalyst to the selective-catalytic-reduction catalyst;
means for controlling flow of the exhaust gas through the oxidation catalyst depending on at least one desired ratio among a pair of the constituents, wherein the exhaust gas enters the selective-catalytic-reduction catalyst With the at least one desired ratio among the pair of the constituents;

means for establishing the at least one desired ratio among the pair of the constituents at the input of the selective-catalytic-reduction catalyst depending on a soot load in a particulate filter arranged between the oxidation catalyst and the selective-catalytic-reduction catalyst and depending on an amount of NO2 which is generated in the particulate filter;

means for establishing a predetermined reaction temperature or temperature range in the selective-catalytic-reduction catalyst wherein the probability that one specific chemical reaction out of the group of possible different chemical reactions between the constituents of the exhaust gas and the catalyst material in the selective-catalytic-reduction catalyst will take place is increased by inputting the exhaust gas into the selective-catalytic-reduction catalyst, wherein the reaction probability for the selected specific chemical reaction is higher than the reaction probability for each one of the other chemical reactions which are not selected.

12. The exhaust system according to claim 11, wherein a valve is provided for controlling the flow of the exhaust gas through the oxidation catalyst and through a bypass line circumventing the oxidation catalyst depending on a desired ratio among members of the constituents.

13. The exhaust system according to claim 11, wherein one or more closing units are provided for controlling a space velocity of the exhaust gas in the oxidation catalyst.

14. The exhaust system according to claim 11, wherein a sensing unit is provided for sensing the amount of NO2 contained in the exhaust entering the selective-catalytic-reduction catalyst.

15. The exhaust system according to claim 14, wherein the sensing unit comprises a NO2-sensitive sensor arranged in the exhaust line downstream of the particulate filer.

16. The exhaust system according to claim 14, wherein the sensing unit comprises a device which provides a virtual sensor by calculating the amount of NO2 entering the selective-catalytic-reduction catalyst depending on operating parameters of the engine and/or on operating parameters of one or more catalysts arranged in the exhaust aftertreatment system.

17. The exhaust system according to claim 11, wherein the establishing means establishes the ratio among the constituents depending on the amount of soot flow from the engine.

18. A non-transitory computer readable medium, comprising a program for performing a method comprising:

controlling the flow of exhaust gas through an oxidation catalyst depending on at least one desired ratio among the pair of the constituents, wherein the exhaust gas enters a selective-catalytic-reduction catalyst with the at least one desired ratio among the pair of the constituents;

establishing the at least one desired ratio among the pair of the constituents at an input of the selective-catalytic-reduction catalyst;

selecting a predetermined reaction temperature or temperature range and establishing it in the selective-catalytic-reduction catalyst wherein the probability is increased that one specific chemical reaction out of the group of possible different chemical reactions between the constituents of the exhaust gas and the catalyst material in the selective-catalytic-reduction catalyst will take place by Inputting the exhaust gas into the selective-catalytic-reduction catalyst, wherein the reaction probability for the selected specific chemical reaction is higher than the reaction probability for each one of the other chemical reactions which are not selected; and establishing the ratio among the constituents depending on the amount of soot a soot load in a particulate filter arranged between the oxidation catalyst and the selective-catalytic-reduction catalyst and depending on an amount of NO2 which is generated in the particulate filter.

19. The computer readable medium according to claim 18, wherein the method comprises establishing the ratio among the constituents depending on the amount of soot flow from the engine.

* * * * *